(12) United States Patent
Bennett et al.

(10) Patent No.: US 9,984,063 B2
(45) Date of Patent: May 29, 2018

(54) SYSTEM AND METHOD FOR AUTOMATIC, UNSUPERVISED PARAPHRASE GENERATION USING A NOVEL FRAMEWORK THAT LEARNS SYNTACTIC CONSTRUCT WHILE RETAINING SEMANTIC MEANING

(71) Applicant: INTERNATIONAL BUSINESS MACHINES CORPORATION, Armonk, NY (US)

(72) Inventors: Laura J. Bennett, Alameda, CA (US); Lakshminarayanan Krishnamurthy, Round Rock, TX (US); Niyati Parameswaran, Santa Clara, CA (US); Sridhar Sudarsan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/266,754

(22) Filed: Sep. 15, 2016

(65) Prior Publication Data
US 2018/0075015 A1 Mar. 15, 2018

(51) Int. Cl.
G06F 17/27 (2006.01)
(52) U.S. Cl.
CPC ........ *G06F 17/2775* (2013.01); *G06F 17/271* (2013.01); *G06F 17/274* (2013.01); *G06F 17/2785* (2013.01)
(58) Field of Classification Search
CPC .... G06F 17/27; G06F 17/2705; G06F 17/277; G06F 17/2775; G06F 17/2785; G06F 17/2795; G06F 17/271

USPC ............................................ 704/1, 9, 257, 4
See application file for complete search history.

(56) References Cited

U.S. PATENT DOCUMENTS

| | | | |
|---|---|---|---|
| 5,237,502 A | 8/1993 | White et al. |
| 6,901,399 B1 | 5/2005 | Corston et al. |
| 7,167,825 B1 | 1/2007 | Potter |
| 7,542,894 B2 | 6/2009 | Murata |
| 7,552,046 B2 | 6/2009 | Brackett et al. |

(Continued)

OTHER PUBLICATIONS

Quirk et al., "Monolingual Machine Translation for Paraphrase Generation", Proceedings of the 2004 Conference on Empirical Methods in Natural Language Processing, EMNLP 2004, Jul. 24, 2004, pp. 142 to 149.*

(Continued)

*Primary Examiner* — Martin Lerner
(74) *Attorney, Agent, or Firm* — Conley Rose, P.C.

(57) ABSTRACT

A system includes a question answering system executed by a computer, a processor, and a memory coupled to the processor. The memory is encoded with instructions that when executed cause the processor to provide training for training the question answering system. The training system is configured to receive a first phrase and a second phrase, the first and second phrases being paraphrases of each other, convert the first phrase into a first logical form and the second phrase into a second logical form, generate a phrasal edit that includes a difference between the first logical form and the second logical form, convert the phrasal edit into a disjunctive logical form in two directions, and generate a first plurality of paraphrases of the first and second phrases based on the disjunctive logical form.

17 Claims, 7 Drawing Sheets

(56) References Cited

U.S. PATENT DOCUMENTS

| | | |
|---|---|---|
| 7,584,092 B2 | 9/2009 | Brackett et al. |
| 8,219,397 B2 | 7/2012 | Jaiswal et al. |
| 8,290,963 B1 | 10/2012 | Pasca et al. |
| 8,554,542 B2* | 10/2013 | Sandor ............... G06F 17/2785 704/1 |
| 9,684,714 B2 | 6/2017 | Levas et al. |
| 2002/0007267 A1 | 1/2002 | Batchilo et al. |
| 2002/0072914 A1* | 6/2002 | Alshawi ............. G06F 17/2827 704/270.1 |
| 2004/0249630 A1* | 12/2004 | Parry ................. G06F 17/2705 704/5 |
| 2005/0065777 A1 | 3/2005 | Dolan et al. |
| 2005/0154580 A1* | 7/2005 | Horowitz ............. G06F 17/271 704/9 |
| 2006/0106595 A1* | 5/2006 | Brockett ............ G06F 17/2785 704/9 |
| 2008/0040339 A1 | 2/2008 | Zhou et al. |
| 2008/0167876 A1 | 7/2008 | Bakis et al. |
| 2008/0270119 A1 | 10/2008 | Suzuki |
| 2009/0112605 A1 | 4/2009 | Gupta |
| 2009/0119090 A1* | 5/2009 | Niu ......................... G06F 17/24 704/1 |
| 2010/0010803 A1 | 1/2010 | Ishikawa et al. |
| 2011/0295589 A1 | 12/2011 | Brockett et al. |
| 2011/0314003 A1* | 12/2011 | Ju ...................... G10L 15/1822 707/723 |
| 2012/0109623 A1* | 5/2012 | Dolan ................. G06F 17/2827 704/2 |
| 2013/0103390 A1 | 4/2013 | Fujita et al. |
| 2015/0331850 A1 | 11/2015 | Ramish |
| 2016/0004766 A1 | 1/2016 | Danielyan et al. |
| 2016/0140958 A1 | 5/2016 | Heo et al. |
| 2016/0179939 A1 | 6/2016 | Levas et al. |
| 2017/0109434 A1 | 4/2017 | Boxwell et al. |
| 2017/0270191 A1 | 9/2017 | Levas et al. |

OTHER PUBLICATIONS

Dolan et al., "Unsupervised Construction of Large Paraphrase Corpora: Exploiting Massively Parallel News Sources", Proceedings of the 20th International Conference on Computational Linguistics, Aug. 23, 2004, pp. 350 to 356.*

Vila et al., "Tree Edit Distance as a Baseline Approach for Paraphrase Representation", Procesamiento del Lenguaje Natural. N. 48 (2012). ISSN 1135-5948, pp. 89 to 95.*

Heilman et al., "Tree Edit Models for Recognizing Textual Entailments, Paraphrases, and Answers to Questions", Human Language Technologies: The 2010 Annual Conference of the North American Chapter of the ACL, Jun. 2010, pp. 1011 to 1019.*

Wang et al., "Probabilistic Tree-Edit Models with Structured Latent Variables for Textual Entailment and Question Answering" Proceedings of the 23rd International Conference on Computational Linguistics, Aug. 2010, pp. 1164 to 1172.*

Heilman et al., "ETS: Discriminative Edit Models for Paraphrase Scoring", First Joint Conference on Lexical and Computational Semantics, Jun. 7-8, 2012, pp. 529 to 535.*

"Syntax" definition from Wikipedia, 7 Pages, downloaded Nov. 2, 2017.*

Hofford, G.; "Structure Logic: A New Method that Enables Richer Meaning Representations"; http://ip.com/IPCOM/000235703D; Mar. 21, 2014.

IBM; "Method and System for Task Identification and Task Execution for Natural Language Instruction Agents"; http://ip.com/IPCOM/000175991D; Oct. 31, 2008.

Fujita et al.; "Measuring the Appropriateness of Automatically Generated Phrasal Paraphrases"; Journal of Natural Language Processing, vol. 17, No. 1, pp. 183-219; Jan. 2010.

Office Action dated Aug. 31, 2017, 17 pages, U.S. Appl. No. 15/266,830, filed Sep. 15, 2016.

Notice of Allowance dated Dec. 21, 2017, 13 pages, U.S. Appl. No. 15/266,830, filed Sep. 15, 2016.

* cited by examiner

FIG. 7 ical form and the second logical form. In an
SYSTEM AND METHOD FOR AUTOMATIC, UNSUPERVISED PARAPHRASE GENERATION USING A NOVEL FRAMEWORK THAT LEARNS SYNTACTIC CONSTRUCT WHILE RETAINING SEMANTIC MEANING STATEMENT REGARDING FEDERALLY SPONSORED RESEARCH OR DEVELOPMENT (If Applicable)

N/A.

STATEMENT REGARDING PRIOR DISCLOSURES BY THE INVENTOR OR A JOINT INVENTOR (If Applicable)

N/A.

BACKGROUND

The present invention relates to training of cognitive computing systems, and more specifically, to techniques and mechanisms for improving the results generated by a Question and Answer system by generating enriched ground truth and providing the enriched ground truth for training the system.

With the increased usage of computing networks, such as the Internet, users can easily be overwhelmed with the amount of information available from various structured and unstructured sources. However, information gaps abound as users try to piece together what they believe to be relevant during searches for information on various subjects. To assist with such searches, research has been directed to creating cognitive systems such as Question and Answer (QA) systems that take an input question, analyze the question, and return results indicative of the most probable answer or answers to the input question. QA systems provide automated mechanisms for searching through large sets of sources of content, e.g., electronic documents, and analyze them with regard to an input question to determine an answer to the question and a confidence measure as to how accurate an answer to the question might be.

The quality of the responses provided by a QA system is tied to the training provided to the system. When a cognitive system is trained, ground truth is provided to the system. The quality of system training, and in turn, the quality of the cognitive system is determined by the quality of the ground truth used to train the system. Therefore, the more comprehensive the ground truth, the higher the quality of the system training.

SUMMARY

According to an embodiment, a method includes receiving, by a paraphrase generation system, a first phrase and a second phrase. The first phrase and the second phrase are paraphrases of each other. The method also includes converting, by the paraphrase generation system, the first phrase into a first logical form and the second phrase into a second logical form. In an embodiment of the method, the first phrase is converted into the first logical form by dependency parsing the first phrase to identify parts of speech of the first phrase thereby generating a first parsed representation of the first phrase. In an embodiment of the method, the second phrase is converted into the second logical form by dependency parsing the second phrase to identify parts of speech of the second phrase thereby generating a second parsed representation of the second phrase. The method also includes generating, by the paraphrase generation system, a plurality of phrasal edits that includes differences between the first logical form and the second logical form. In an embodiment of the method, the phrasal edits are generated by comparing the first parsed representation of the first phrase with the second parsed representation of the second phrase to determine a word from the first phrase that corresponds with a word from the second phrase. The method also includes, converting, by the paraphrase generation system, the plurality of phrasal edits into a plurality of disjunctive logical forms in two directions. In an embodiment of the method, plurality of disjunctive logical forms includes a plurality of disjunctions that represent alternative choices of words at a level of semantic dependencies. In an embodiment, the plurality of phrasal edits is converted into the plurality of disjunctive logical forms by generating a trigram model. In an embodiment, the trigram model is a bi-directional frequency distribution model for words in the first and second phrases. The method also includes generating, by the paraphrase generation system based on the plurality of disjunctive logical forms in two directions, a first plurality of paraphrases of the first and second phrases. An embodiment of the method may also include pruning, by the paraphrase generation system, the first plurality of paraphrases to yield a second plurality of paraphrases containing grammatical alternatives to the first and second phrases. Additionally, an embodiment of the method may also include providing the second plurality of paraphrases and intent of the first and second phrases to a question answering system as enriched ground truth.

In another embodiment, a system/apparatus is provided. The system/apparatus includes a question answering system executed by a computer, one or more processors, and memory. The memory is encoded with instructions that when executed cause the one or more processors to provide a training system for training the question answering system. The training system may be configured to perform various ones of, and various combinations of the operations described above with respect to embodiments of a method.

In a further embodiment, a computer program product including a computer readable storage medium encoded with program instructions is provided. The program instructions are executable by a computer to cause the computer to perform various ones of, and various combinations of the operations described above with respect to embodiments of a method.

DETAILED DESCRIPTION

The quality of the responses provided by a QA system is tied to the training provided to the system. When a cognitive system is trained, ground truth is provided to the system. The quality of system training, and in turn, the quality of the cognitive system is determined by the quality of the ground truth used to train the system. Therefore, the more comprehensive the ground truth, the higher the quality of the system training. Therefore, it is desirable to develop a system to automatically generate additional questions as a part of the ground truth so that a training system may provide higher quality training.

Figure 1:
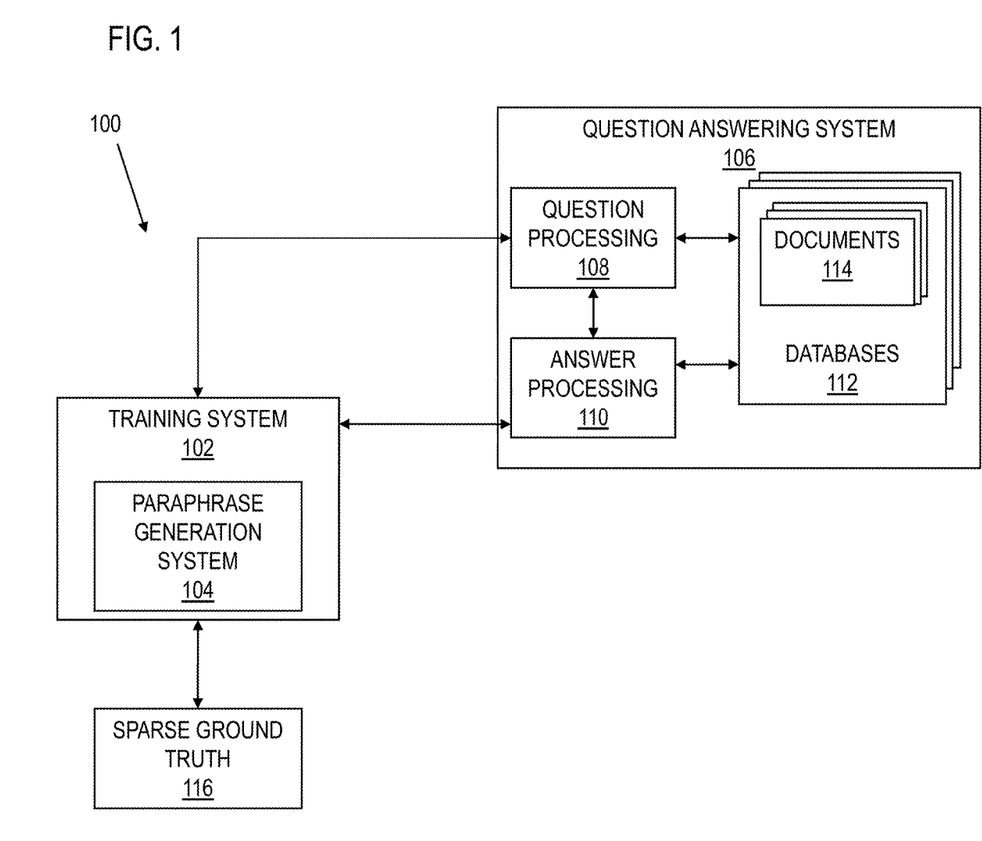
FIG. 1 shows an illustrative block diagram of a system that provides training of a question answering system in accordance with various embodiments.

FIG. 1 shows a block diagram of a system 100 that provides training of a QA system in accordance with various embodiments. The system 100 includes a QA system 106 and a training system 102. The QA system 106 is a machine learning system that receives training from the training system 102. The training guides and adjusts the operation of the QA system 106 to improve the quality of the answers provided by the QA system 106. The QA system 106 is illustrative and is not intended to state or imply any limitation with regard to the type of QA mechanisms with which various embodiments may be implemented. Many modifications to the example QA system 100 may be implemented in various embodiments.

The system 100, including the QA system 106 and the training system 102 may be implemented on one or more computing devices (comprising one or more processors and one or more memories, and optionally including any other computing device elements generally known in the art including buses, storage devices, communication interfaces, and the like).

The QA system 100 operates by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

The QA system 106 includes question processing 108, answer processing 110, and databases 112. The databases 112 store documents 114 that serve as at least a part of the corpus of content from which answers to questions are derived. The documents 114 may include any file, text, article, or source of data for use in the QA system 106. The question processing 108 receives questions to be answered by the QA system 106. The questions may be formed using natural language. The questions may be provided by the training system 102 to facilitate training of the QA system 106, or may be provided by users of the QA system 106. The training system 102 may be coupled to the QA system 106 via a network, such as a local area network, a wide area network, the internet, or other communication system.

In some illustrative embodiments, the QA system 106 may be the IBM Watson™ QA system available from International Business Machines Corporation of Armonk, N.Y. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus for portions of the corpus of data that have some potential for containing a valuable response to the input question.

The IBM Watson™ QA system analyzes the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data.

Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

The question processing 108 receives input questions that are presented in a natural language format. That is, a user of the training system 102 may input, via a user interface, an input question to obtain an answer. In response to receiving the input question, the question processing 108 parses the input question using natural language processing techniques to extract major features from the input question, classify the major features according to types, e.g., names, dates, or any of a variety of other defined topics. The identified major features may then be used to decompose the question into one or more queries that may be submitted to the databases 112 in order to generate one or more hypotheses. The queries may be generated in any known or later developed query language, such as the Structure Query Language (SQL), or the like. The queries may be submitted to one or more databases 112 storing the documents 114 and other information.

The queries may be submitted to one or more databases 112 storing information about the electronic texts, documents, articles, websites, and the like, that make up the corpus of data/information. The queries are submitted to the databases 112 to generate results identifying potential hypotheses for answering the input question. That is, the submission of the queries results in the extraction of portions of the corpus of data/information matching the criteria of the particular query. These portions of the corpus are analyzed and used to generate hypotheses for answering the input question. These hypotheses are also referred to herein as "candidate answers" for the input question. For any input question, there may be hundreds of hypotheses or candidate answers generated that need to be evaluated.

The answer processing 110 analyzes and compares the language of the input question and the language of each hypothesis or "candidate answer" as well as performs evidence scoring to evaluate the likelihood that a particular hypothesis is a correct answer for the input question. As mentioned above, this process may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

The answer processing 110 may synthesize the large number of relevance scores generated by the various reasoning algorithms into confidence scores for the various hypotheses. This process may involve applying weights to the various scores, where the weights have been determined through training of the statistical model employed by the QA system 106. The weighted scores may be processed in accordance with a statistical model generated through training of the QA system 106 that identifies a manner by which these scores may be combined to generate a confidence score or measure for the individual hypotheses or candidate answers. This confidence score or measure summarizes the level of confidence that the QA system 106 has about the evidence that the candidate answer is inferred by the input question, i.e. that the candidate answer is the correct answer for the input question.

In the answer processing 110, the resulting confidence scores or measures may be compared against predetermined thresholds, or other analysis may be performed on the confidence scores to determine which hypotheses/candidate answers are most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, a final answer and confidence score, or final set of candidate answers and confidence scores, may be generated and output to the submitter of the original input question.

The training system 102 facilitates configuration of the QA system 106 to provide answers to submitted questions and to improve the quality of the answers provided to submitted questions. The quality of the answers to a submitted question may be improved by selecting the candidate answers that are most relevant to the question. The quality of the answers provided by the QA system 106 is related to the ground truth that is used to train the QA system 106. Embodiments of the training system 102 improve the quality of the answers provided by the QA system 106 by enriching the ground truth that is used to train the QA system 106. Ground truth is questions, in the form of phrases and/or sentences, which are mapped to a known intent and/or answer. For example, the questions, "How can I close my account?" and "Is there a way I can shut my account?" may be mapped to an intent "closing an account." In another example, the questions, "What is the capital of California?" and "What is the capital of CA?" may be mapped to the answer "Sacramento." The QA system 106 then may be trained to determine that similar questions to the questions provided as part of the ground truth should provide similar answers because the intent of the questions is the same.

In one embodiment, the training system 102 provides a number of questions to the QA system 106. The questions provided by the training system 102 to the QA system 106 are referred to herein as "training questions." The QA system 106 processes the training questions and selects a number of candidate answers for each of the training questions. The QA system 106 provides the candidate answers to the training system 102. The candidate answers generated by the QA system 106 are compared by the training system 102 to correct answers in the ground truth. That is, the training performed by training system 102 may include the use of a known input question on a known training set of data with the goal being for the QA system 106 to generate the known correct answers found in the ground truth. By comparing the candidate answers to the known correct answers in the ground truth using logic found in the training system 102, the training system 102 may determine whether the QA system 106 is operating in the desired manner and where differences occur between the answers generated by the QA system 106 and the correct answers. In the event that the QA system 106 returns an incorrect answer to a training question, the training system 102 may adjust the logic and/or algorithms of the QA system 106, and more particularly, the answer processing 110 to decrease the confidence score for the incorrectly provided answer. In the event that the QA system 106 returns a correct answer to the training question, the training system 102 may adjust the logic and/or algorithms of the QA system 106, and more particularly, the answer processing 110 to increase the confidence score for the correctly provided answer. In this way, the training system 102 is able to train the QA system 106 to provide correct answers to input questions.

In some embodiments, the ground truth is provided to the training system 102 by customers, experts, and/or generated by the training system itself through, for example, crawling encyclopedias for questions and answers. In an embodiment, the training system 102 receives sparse ground truth 116 as the initial ground truth for use by the training system. Sparse ground truth 116 is ground truth for a particular intent that includes a limited number of questions that are mapped to that intent. For example, sparse ground truth 116 may include only two questions mapped to a single intent. Thus, the sparse ground truth 116 may provide lesser training capabilities for training system 102 than more enriched ground truth (i.e., ground truth with more questions mapped to the single intent). Because the questions contained in the sparse ground truth 116 are mapped to the same intent, they may be considered paraphrases of one another.

In order to provide a more robust training system 102, paraphrase generation system 104 is configured to receive the sparse ground truth 116 and generate additional paraphrases to increase the ground truth utilized by training system 102 to train QA system 106. For example, the training system 102 may receive only two questions, "How can I close my account?" and "Is there a way I can shut my account?" that are mapped to the intent "closing an account" as part of the sparse ground truth 116. The paraphrase generation system 104 is configured to generate paraphrases of these two questions, and thus, increase the ground truth utilized to train QA system 106. For example, the paraphrase generation system 104 may generate questions such as, "Is there a way for me to close my account?", "How can I shut my account?", "How could I close my account?", etc. as additional questions mapped to the intent "closing an account." Thus, the ground truth is automatically enriched by the training system 102 through the generation of additional paraphrases of the original questions in the sparse ground truth 116.

Figure 2:
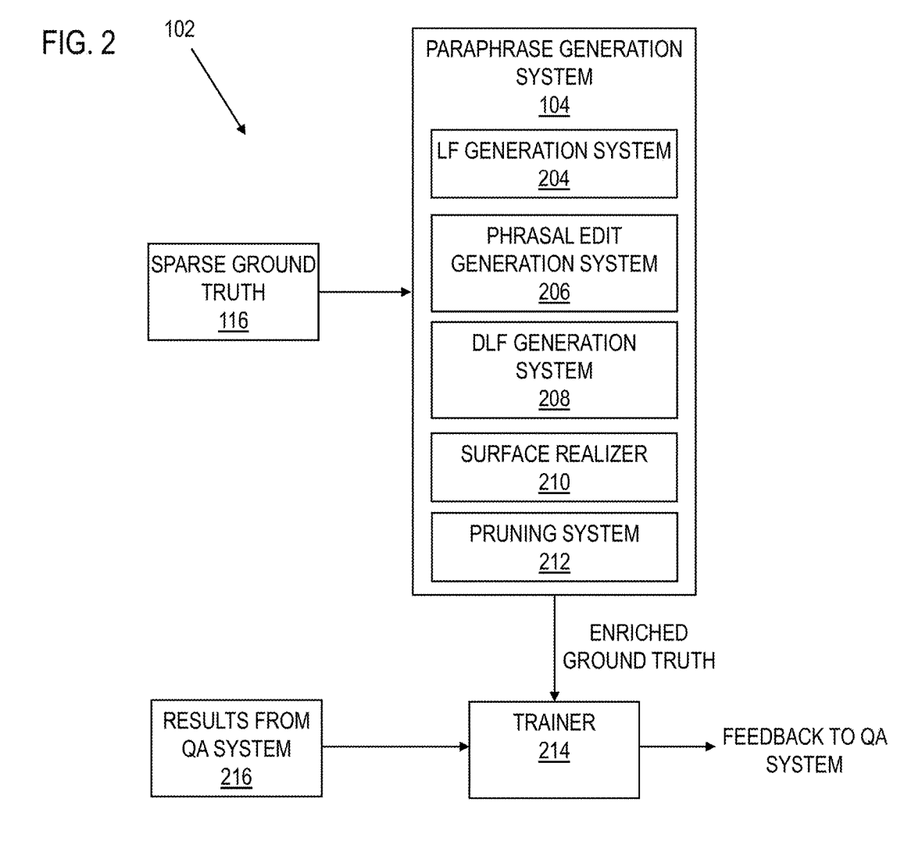
FIG. 2 shows an illustrative block diagram of a training system that includes a paraphrase generation system to generate paraphrases of ground truth questions to provide training of a question answering system in accordance with various embodiments.

FIG. 2 shows an illustrative block diagram of training system 102 that includes paraphrase generation system 104 to generate paraphrases of ground truth questions to provide training of a QA system 106 in accordance with various embodiments. The paraphrase generation system may include a logical form (LF) generation system 204, a phrasal edit generation system 206, a disjunctive logical form (DLF) generation system 208, surface realizer 210, and pruning system 212. As discussed above, the paraphrase generation system 104 receives the sparse ground truth 116. In other words, paraphrase generation system 104 receives at least a first phrase and/or sentence and a second phrase and/or sentence (i.e., questions) mapped to a single intent. Because the first question and the second question are mapped to the same intent, the first question and the second question are paraphrases of each other. For example, the first question may be, "How can I close my account?" while the second question may be, "Is there a way I can shut my account?"

The LF generation system 204 is configured to receive the first and second questions and convert the first and second questions into logical forms. In other words, the LF generation system 204 is configured to receive the first question and convert it into a first logical form and receive the second question and convert it into a second logical form. A logical form of a sentence is the form of the sentence after the subject matter of the sentences content terms have been abstracted. In other words, the content terms of sentence may be regarded as blanks on a form. In some embodiments, the LF generation system 204 may create the logical forms that result from a statistical parse of the first and second questions. For example, the LF generation system 204 may dependency parse the two questions to generate a parsed representation of each of the questions. Dependency parsing establishes relationships between specific words in the question and words which modify those specific words. In other words, dependency parsing allows the LF generation system 204 to identify the component parts of speech (e.g., subject, adjective, verb, adverb, object, etc.) of the words in the two questions.

The phrasal edit generation system 206 receives the logical forms of the first and second questions, including the parsed representation of each question, and generates a number of phrasal edits. The phrasal edits include differences between the logical forms of the two sentences. In other words, the phrasal edit generation system 206 receives the parsed representations of each question and determines differences between the two representations, both syntactically and semantically. For example, the phrasal edit generation system 206 may determine that in the question "Is it a bright day?" the term "bright" corresponds with the term "sunny" in the question "Is it a sunny day?" because both "bright" and "sunny" are adjectives that modify "day." Thus, the phrasal edit generation system 206 may generate a variety of phrases from the two questions which are edits of one another.

The DLF generation system 208 is configured to receive the phrasal edits from the phrasal edits generation system 206 and convert the phrasal edits into disjunctive logical forms in two directions. In other words, the DLF generation system 208 generates bidirectional disjunctive logical forms. For example, in the English language, sentences are generally read from left to right. Thus, humans typically assume that the structure of the sentence is from left to right only. However, the sentence also has structure from right to left. To a machine, there is no difference between a left to right structure or a right to left structure. Thus, the DLF generation system 208 generates disjunctive logical forms in both directions (i.e., from left to right and from right to left).

Each of the bidirectional disjunctive logical forms includes disjunctions that represent alternative choices of words at a level of semantic dependencies. A disjunction may be a syntactic construction in which two or more words of the same component part of speech are combined while maintaining the same semantic relations with surrounding elements of the sentence. In some embodiments, to generate the bidirectional disjunctive logical forms, the DLF generation system 208 may generate bigram models from the phrasal edits. A bigram model is a sequence of two adjacent words with a frequency distribution of those two adjacent words. Thus, knowing one word (the first word) in the bigram allows the paraphrase generation system 104 to predict the next word (the second word). Because the disjunctive logical forms are bidirectional, knowing one word (the second word) in the bigram allows the paraphrase generation system 104 to predict the previous word (the first word) as well. In this way, the DLF generation system 208 may construct a trigram model. A trigram model is a sequence of three adjacent words with a frequency distribution of the adjacent words. Thus, knowing one word allows the DLF generation system 208 to predict both the previous word and the next word. Hence, the bidirectionality of the disjunctive logical forms allows the paraphrase generation system 104 to introduce greater variation in the number of question paraphrases that may be generated because the structure and language of the first and second questions are analyzed from both left to right and from right to left. In other words, utilizing bidirectional disjunctive logical forms enables the examination of natural language for a richer understanding of syntactic construct thereby resulting in the creation of more refined and accurate syntactic variants that retain semantic meaning of the original two questions.

Surface realizer 210 is configured to receive and realize the bidirectional disjunctive logical forms to generate paraphrases of the first and second questions. For example, surface realizer 210 may be any surface realizer that takes in the bidirectional disjunctive logical forms and produces an ordered sequence of words that are constrained by grammatical rules and lexicon. In other words, the surface realizer 210 takes the syntactic representation of text from the bidirectional disjunctive logical forms and generates natural language text. Due to the variations created by the DLF generation system 208 from the bidirectional analysis in generating the disjunctive logical forms, lexical diversity is increased. In an example, the surface realizer 210 utilizes OpenCCG to generate the paraphrases.

Pruning system 212 is configured to receive and, in some embodiments, score the paraphrases generated by the surface realizer 210. Pruning system 212 may score each of the paraphrases generated by the surface realizer 210 based on textual similarity between the first and second questions of the sparse truth 116 and each respective paraphrase generated by the surface realizer 210. In some embodiments, the pruning system 212 may compare a first paraphrase generated by the surface realizer 210 with the first and second questions from the sparse ground truth 116 and generate a score based on the syntactic variation and semantic meaning of the paraphrase generated by the surface realizer 210. A paraphrase generated by surface realizer 210 may be assigned a higher score if the syntactic variation with respect to the first and second questions is larger than if the syntactic variation is lower, so long as the semantic meaning remains similar to the semantic meaning of the first and second questions. In other words, the pruning system 212 generates scores that bias towards paraphrases that bear higher syntactic variation while maintaining semantic meaning and bias against paraphrases that bear minimal syntactic variation while maintaining semantic meaning.

Pruning system 212 then may prune the paraphrases generated by the surface realizer 210 to a list of n-best paraphrases that provide grammatical alternatives to the original first and second questions as well as paraphrases that mix and match content (e.g., words) across the pair of questions. In some embodiments, the pruning system 212 may remove the paraphrases generated by the surface realizer 210 with the lowest scores so that the n-best paraphrases are maintained. For example, if the surface realizer 210 generates 30 paraphrases for the first and second questions, the pruning system 212 may remove the lowest scoring 22-24 so that 6-8 paraphrases remain in the list of n-best paraphrases. In other examples, any number of paraphrases may be pruned from the paraphrases generated by surface realizer 210. In this way, the paraphrase generation system 202 may generate additional questions to enrich the ground truth utilized to train the QA system 106.

The enriched ground truth, including the original two questions from the sparse ground truth 116 and the generated n-best paraphrases which are mapped to an intent, may be provided to trainer 214 for training the QA system 106. In some embodiments, the enriched ground truth is stored in a storage media (i.e., memory) in the trainer 214. The trainer 214 may train the QA system as discussed above. For example, the trainer 214 may receive results of a known input question (i.e., a training question) from the QA system 216. By comparing the results to the known correct answers in the ground truth using logic found in the trainer 214, the trainer 214 may determine whether the QA system 106 is operating in the desired manner and where differences occur between the answers generated by the QA system 106 and the correct answers. In the event that the QA system 106 returns an incorrect answer to a training question, the trainer 214 may adjust the logic and/or algorithms of the QA system 106, and more particularly, the answer processing 110 to decrease the confidence score for the incorrectly provided answer. In the event that the QA system 106 returns a correct answer to the training question, the trainer 214 may adjust the logic and/or algorithms of the QA system 106, and more particularly, the answer processing 110 to increase the confidence score for the correctly provided answer. In this way, the training system 102 is able to train the QA system 106 to provide correct answers to input questions.

Figure 3:
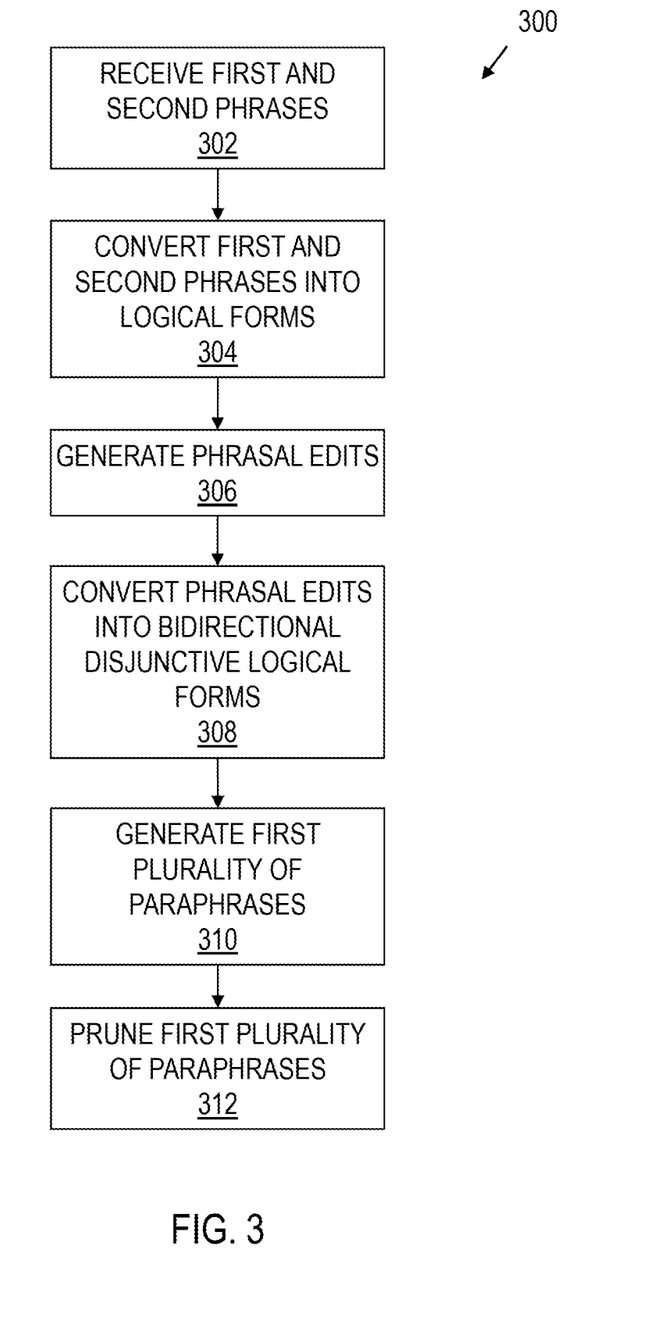
FIG. 3 shows a flow diagram illustrating aspects of operations that may be performed to generate paraphrases of ground truth questions to train a question answering system in accordance with various embodiments.

FIG. 3 shows a flow diagram illustrating aspects of operations that may be performed to generate paraphrases of ground truth questions to train a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the system 100.

The method 300 begins in block 302 with receiving a first and a second phrase, such as a question and/or other sentence. The first and second phrases may be a part of a sparse ground truth, such as sparse ground truth 116 and may be created by the training system 102, by another computer system, and/or by a human. In block 304, the method 300 continues with converting the first and second phrases into logical forms. For example, the first phrase may be dependency parsed to identify parts of speech of the first phrase thereby generating a first parsed representation of the first phrase. Similarly, the second phrase may be dependency parsed to identify parts of speech of the second phrase thereby generating a second parsed representation of the second phrase.

The method 300 continues in block 306 with generating phrasal edits from the logical forms. For example, the first parsed representation of the first phrase may be compared with the second parsed representation of the second phrase to determine one or more words from the first phrase that correspond with one or more words from the second phrase. In other words, a variety of phrases from the first and second phrases which are edits of one another may be identified. In an example, the phrasal edit generation system 206 may determine that in the question "Is it a bright day?" the term "bright" corresponds with the term "sunny" in the question "Is it a sunny day?" because both "bright" and "sunny" are adjectives that modify "day."

In block 308, the method 300 continues with converting the phrasal edits into bidirectional disjunctive logical forms. Each of the bidirectional disjunctive logical forms may include disjunctions that represent alternative choices of words at a level of semantic dependencies. In some embodiments bigram models may be generated from the phrasal edits. Thus, knowing one word (the first word) in the bigram allows a prediction of the next word (the second word) and, because the disjunctive logical forms are bidirectional, knowing one word (the second word) in the bigram allows a prediction of the previous word (the first word). Hence, a trigram model, which is a bidirectional frequency distribution model for the words in the first and second phrases, may be generated such that knowing one word allows a prediction of both the previous word and the next word.

The method 300 continues in block 310 with generating a first plurality of paraphrases. For example, the bidirectional disjunctive logical forms may be fed into a surface realizer, such as surface realizer 210, which generates a number of ordered sequences of words that are constrained by grammatical rules and lexicon. In block 312, the method 300 continues with pruning the first plurality of paraphrases to yield a second plurality of paraphrases containing grammatical alternatives to the first and second phrases. For example, scores for each of the first plurality of paraphrases may be generated based on the syntactic variation of the each respective paraphrase with the first and second phrases. Paraphrases from the first plurality of paraphrases with the lowest scores may be removed so that an n-best number of paraphrases remain. For example, if 30 paraphrases are generated as part of the first plurality of paraphrases, the lowest scoring 22-24 paraphrases within the first plurality of paraphrases may be removed so that 6-8 paraphrases remain in the list of n-best paraphrases.

Figure 4:
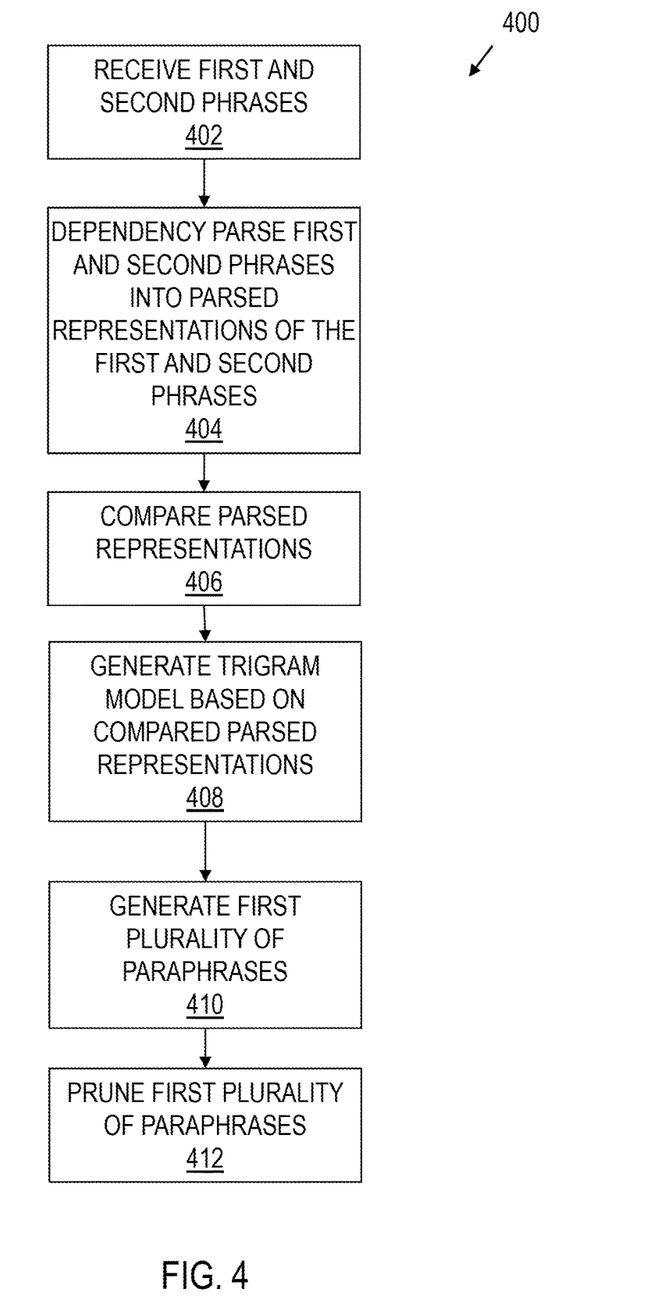
FIG. 4 shows a flow diagram illustrating aspects of operations that may be performed to generate paraphrases of ground truth questions to train a question answering system in accordance with various embodiments.

FIG. 4 shows a flow diagram illustrating aspects of operations that may be performed to generate paraphrases of ground truth questions to train a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the system 100.

The method 400 begins in block 402 with receiving a first and a second phrase, such as a question and/or other sentence. The first and second phrases may be a part of a sparse ground truth, such as sparse ground truth 116 and may be created by the training system 102, by another computer system, and/or by a human. In block 404, the method 400 continues with dependency parsing the first and second phrases to identify parts of speech of the first and second phrases thereby generating a first parsed representation of the first phrase and a second parsed representation of the second phrase.

The method 400 continues in block 406 with comparing the first parsed representation of the first phrase with the second parsed representation of the second phrase to determine one or more words from the first phrase that correspond with a word from the second phrase. In other words, a variety of phrases from the first and second phrases which are edits of one another may be identified. In an example, the phrasal edit generation system 206 may determine that in the question "Is it a bright day?" the term "bright" corresponds with the term "sunny" in the question "Is it a sunny day?" because both "bright" and "sunny" are adjectives that modify "day."

In block 408, the method 400 continues with generating one or more trigram models. A trigram model, which is a bidirectional frequency distribution model for the words in the first and second phrases, may be generated such that knowing one word allows a prediction of both the previous word and the next word. The method 400 continues in block 410 with generating a first plurality of paraphrases. For example, a surface realizer 210 may generate a number of ordered sequences of words that are constrained by grammatical rules and lexicon based on the one or more trigram models. In block 412, the method 400 continues with pruning the first plurality of paraphrases to yield a second plurality of paraphrases containing grammatical alternatives to the first and second phrases. For example, scores for each of the first plurality of paraphrases may be generated based on the syntactic variation of the each respective paraphrase with the first and second phrases. Paraphrases from the first plurality of paraphrases with the lowest scores may be removed so that an n-best number of paraphrases remain. For example, if 30 paraphrases are generated as part of the first plurality of paraphrases, the lowest scoring 22-24 paraphrases within the first plurality of paraphrases may be removed so that 6-8 paraphrases remain in the list of n-best paraphrases.

Figure 5:
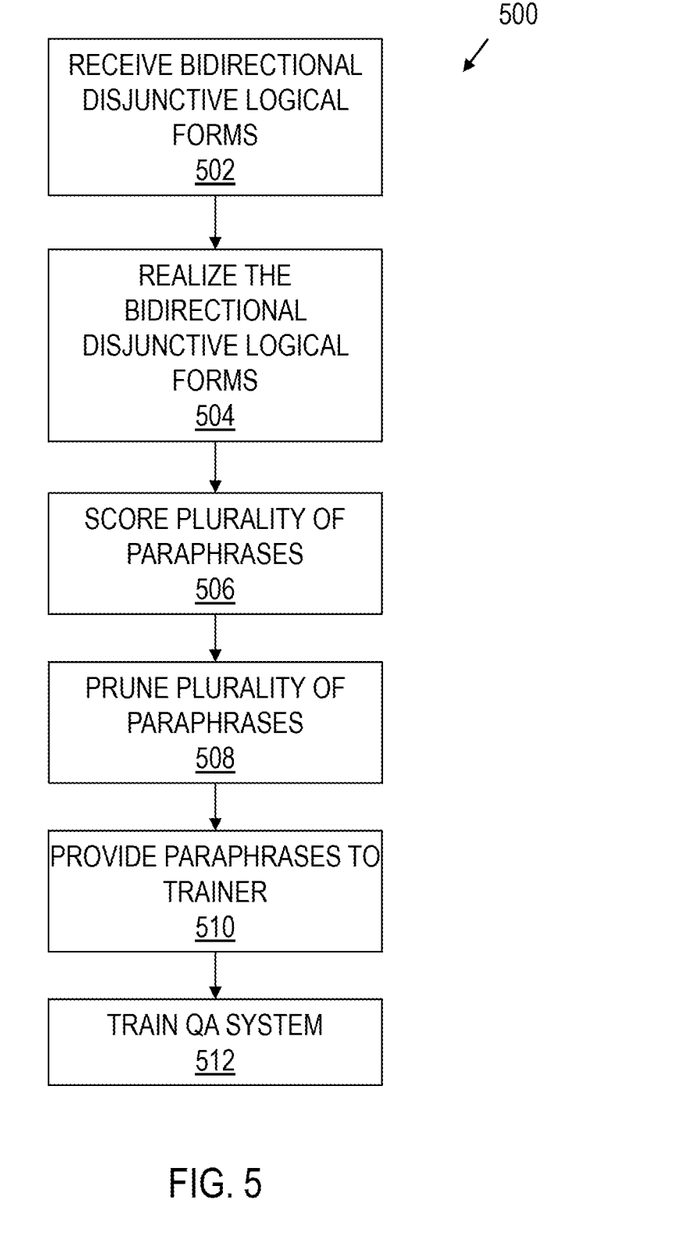
FIG. 5 shows a flow diagram illustrating aspects of operations that may be performed to generate paraphrases of ground truth questions to train a question answering system in accordance with various embodiments.

FIG. 5 shows a flow diagram illustrating aspects of operations that may be performed to generate paraphrases of ground truth questions to train a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the system 100.

The method 500 begins in block 502 with receiving bidirectional disjunctive logical forms, in some embodiments by a surface realizer, such as surface realizer 210. The bidirectional disjunctive logical forms include two direction disjunctions (i.e., bidirectional) of differences between a first logical form of a first sentence and a second logical form of a second sentence. For example, each of the bidirectional disjunctive logical forms may include disjunctions that represent alternative choices of words at a level of semantic dependencies.

The method 500 continues in block 504 with realizing the bidirectional disjunctive logical forms to generate a first plurality of paraphrases of the first and second sentences. For example, the bidirectional disjunctive logical forms may be fed into a surface realizer, such as surface realizer 210, which generates a number of ordered sequences of words that are constrained by grammatical rules and lexicon. In block 506, the method 500 continues with scoring each of the first plurality of paraphrases based on textual similarity between the first plurality of paraphrases and the first and second sentences. For example, a paraphrase may be assigned a higher score if the syntactic variation with respect to the first and second sentences is larger than if the syntactic variation is lower, so long as the semantic meaning remains similar to the semantic meaning of the first and second sentences. In other words, scores may be biased such that paraphrases that bear higher syntactic variation while maintaining semantic meaning receive higher scores and paraphrases that bear minimal syntactic variation while maintaining semantic meaning receive lower scores.

The method 500 continues in block 508 with pruning, based on the scores of each of the first plurality of paraphrases, the first plurality of paraphrases to generate a second plurality of paraphrases. For example, paraphrases from the first plurality of paraphrases with the lowest scores may be removed so that an n-best number of paraphrases remain. Thus, if 30 paraphrases are generated as part of the first plurality of paraphrases, the lowest scoring 22-24 paraphrases within the first plurality of paraphrases may be removed so that 6-8 paraphrases remain in the list of n-best paraphrases.

In block 510, the method 500 continues with providing the second plurality of paraphrases (i.e., the n-best paraphrases) to a trainer for training a QA system. For example, the second plurality of paraphrases may be provided to a trainer, such as trainer 214 as part of enriched ground truth that may be utilized to train QA system 106. The method 500 continues in block 512 with training the QA system. For example, the trainer may compare the results of a training query of the QA system to the known correct answers in the enriched ground truth. In the event that the QA system returns an incorrect answer to a training question, the trainer may adjust the QA system to decrease a confidence score for the incorrectly provided answer. In the event that the QA system returns a correct answer to the training question, the trainer may adjust the QA system to increase the confidence score for the correctly provided answer.

Figure 6:
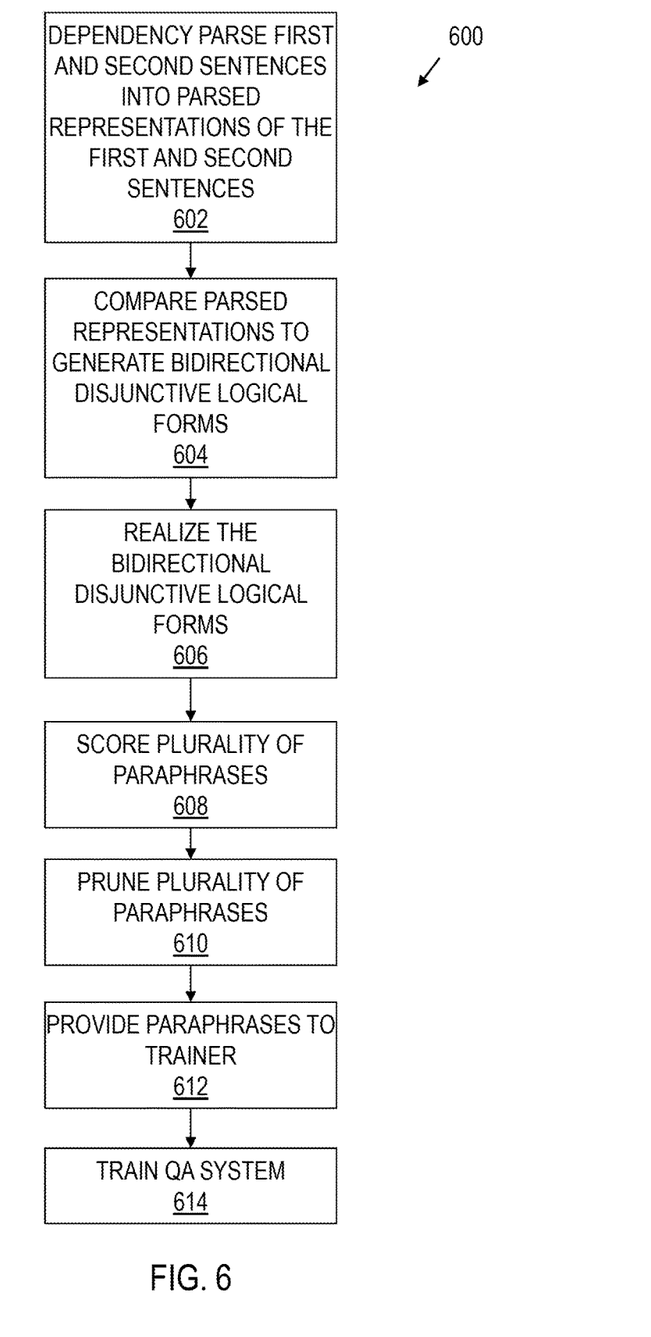
FIG. 6 shows a flow diagram illustrating aspects of operations that may be performed to generate paraphrases of ground truth questions to train a question answering system in accordance with various embodiments.

FIG. 6 shows a flow diagram illustrating aspects of operations that may be performed to generate paraphrases of ground truth questions to train a question answering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the system 100.

The method 600 begins in block 602 with dependency parsing the first and second phrases to identify parts of speech of the first and second phrases thereby generating a first parsed representation of the first phrase and a second parsed representation of the second phrase. In block 604, the method 600 continues with comparing the first parsed representation of the first phrase with the second parsed representation of the second phrase to determine one or more words from the first phrase that correspond with a word from the second phrase. In other words, a variety of phrases from the first and second phrases which are edits of one another may be identified. In an example, the phrasal edit generation system 206 may determine that in the question "Is it a bright day?" the term "bright" corresponds with the term "sunny" in the question "Is it a sunny day?" because both "bright" and "sunny" are adjectives that modify "day."

The method 600 continues in block 606 with realizing the bidirectional disjunctive logical forms to generate a first plurality of paraphrases of the first and second sentences. For example, a surface realizer, such as surface realizer 210, may generate a number of ordered sequences of words that are constrained by grammatical rules and lexicon based on the comparison of the first and second parsed representations. In block 608, the method 600 continues with scoring each of the first plurality of paraphrases based on textual similarity between the first plurality of paraphrases and the first and second sentences. For example, a paraphrase may be assigned a higher score if the syntactic variation with respect to the first and second sentences is larger than if the syntactic variation is lower, so long as the semantic meaning remains similar to the semantic meaning of the first and second sentences. In other words, scores may be biased such that paraphrases that bear higher syntactic variation while maintaining semantic meaning receive higher scores and paraphrases that bear minimal syntactic variation while maintaining semantic meaning receive lower scores.

The method 600 continues in block 610 with pruning, based on the scores of each of the first plurality of paraphrases, the first plurality of paraphrases to generate a second plurality of paraphrases. For example, paraphrases from the first plurality of paraphrases with the lowest scores may be removed so that an n-best number of paraphrases remain. Thus, if 30 paraphrases are generated as part of the first plurality of paraphrases, the lowest scoring 22-24 paraphrases within the first plurality of paraphrases may be removed so that 6-8 paraphrases remain in the list of n-best paraphrases.

In block 612, the method 600 continues with providing the second plurality of paraphrases (i.e., the n-best paraphrases) to a trainer for training a QA system. For example, the second plurality of paraphrases may be provided to a trainer, such as trainer 214 as part of enriched ground truth that may be utilized to train QA system 106. The method 600 continues in block 614 with training the QA system. For example, the trainer may compare the results of a training query of the QA system to the known correct answers in the enriched ground truth. In the event that the QA system returns an incorrect answer to a training question, the trainer may adjust the QA system to decrease a confidence score for the incorrectly provided answer. In the event that the QA system returns a correct answer to the training question, the trainer may adjust the QA system to increase the confidence score for the correctly provided answer.

Figure 7:
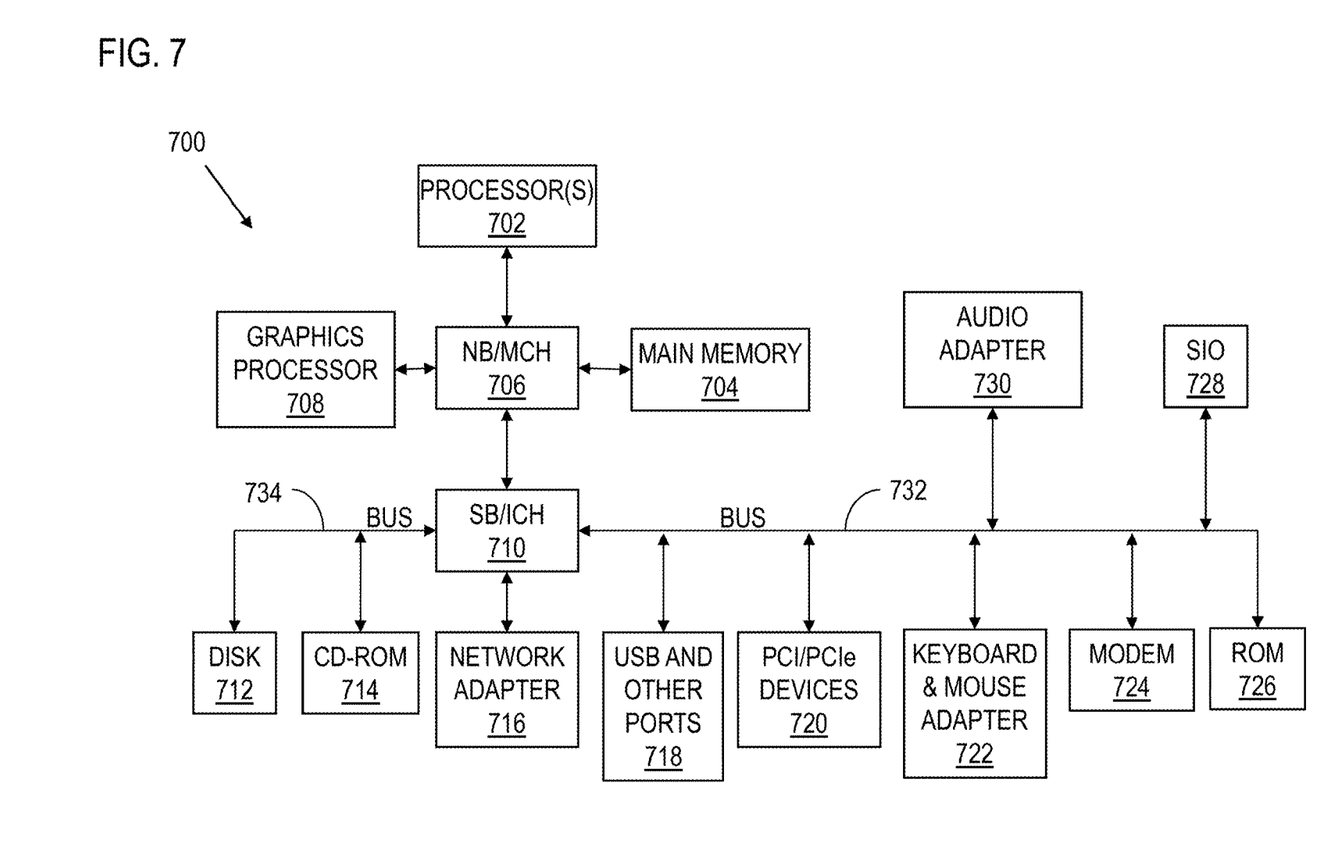
FIG. 7 shows an illustrative block diagram of an example data processing system that can be applied to implement embodiments of the present disclosure.

FIG. 7 is a block diagram of an example data processing system in which aspects of the illustrative embodiments may be implemented. Data processing system 700 is an example of a computer that can be applied to implement the training system 102, the QA system system 106, or devices providing the sparse ground truth 116 to the training system 102 in FIG. 1, in which computer usable code or instructions implementing the processes for illustrative embodiments of the present invention may be located. In one illustrative embodiment, FIG. 7 represents a computing device that implements the training system 102 augmented to include the additional mechanisms of the illustrative embodiments described hereafter.

In the depicted example, data processing system 700 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP).

In the depicted example, local area network (LAN) adapter 716 connects to SB/ICH 710. Audio adapter 730, keyboard and mouse adapter 722, modem 724, read only memory (ROM) 726, hard disk drive (HDD) 712, CD-ROM drive 714, universal serial bus (USB) ports and other communication ports 718, and PCI/PCIe devices 720 connect to SB/ICH 710 through bus 732 and bus 734. PCI/PCIe devices may include, for example, Ethernet adapters, add-in cards, and PC cards for notebook computers. PCI uses a card bus controller, while PCIe does not. ROM 726 may be, for example, a flash basic input/output system (BIOS).

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. Super I/O (SIO) device 728 may be connected to SB/ICH 710.

An operating system runs on processor(s) 702. The operating system coordinates and provides control of various components within the data processing system 700 in FIG. 7. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

In some embodiments, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors 702. Alternatively, a single processor system may be employed.

Instructions for the operating system, the object-oriented programming system, and applications or programs are located on storage devices, such as HDD 712, and may be loaded into main memory 704 for execution by processor(s) 702. The processes for illustrative embodiments of the present invention may be performed by processor(s) 702 using computer usable program code, which may be located in a memory such as, for example, main memory 704, ROM 726, or in one or more peripheral devices 712 and 714, for example.

A bus system, such as bus 732 or bus 734 as shown in FIG. 7, may include one or more buses. The bus system may be implemented using any type of communication fabric or architecture that provides for a transfer of data between different components or devices attached to the fabric or architecture. A communication unit, such as modem 724 or network adapter 716 of FIG. 7, may include one or more devices used to transmit and receive data. A memory may be, for example, main memory 704, ROM 726, or a cache such as found in NB/MCH 706 in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a paraphrase generation system, a first phrase and a second phrase, the first and second phrases being paraphrases of each other;
   converting, by the paraphrase generation system, the first phrase into a first logical form and the second phrase into a second logical form;
   generating, by the paraphrase generation system, a plurality of phrasal edits that includes differences between the first logical form and the second logical form;
   converting, by the paraphrase generation system, the plurality of phrasal edits into a plurality of disjunctive logical forms in two directions;
   generating, by the paraphrase generation system based on the plurality of disjunctive logical forms in two directions, a first plurality of paraphrases of the first and second phrases;
   determining a first score for a first paraphrase of the first plurality of paraphrases;
   determining a second score for a second paraphrase of the first plurality of paraphrases, wherein the first score is higher than the second score based in part on a first syntactic variation between the first paraphrase and the first phrase and the second phrase being greater than a second syntactic variation between the second paraphrase and the first phrase and the second phrase; and
   pruning, by the paraphrase generation system, the first plurality of paraphrases to yield a second plurality of paraphrases including grammatical alternatives to the first and second phrases, wherein the first and second paraphrases are pruned based on the first score and the second score such that the first paraphrase is included in the second plurality of paraphrases and the second paraphrase is not included in the second plurality of paraphrases based on the first score being higher than the second score.

2. The method of claim 1, wherein the converting the first phrase into the first logical form includes dependency parsing the first phrase to identify parts of speech of the first phrase thereby generating a first parsed representation of the first phrase and the converting the second phrase into the second logical form includes dependency parsing the second phrase to identify parts of speech of the second phrase thereby generating a second parsed representation of the second phrase.

3. The method of claim 2, wherein the generating the plurality of phrasal edits includes comparing the first parsed representation of the first phrase with the second parsed representation of the second phrase to determine a word from the first phrase that corresponds with a word from the second phrase.

4. The method of claim 1, wherein the plurality of disjunctive logical forms includes a plurality of disjunctions that represent alternative choices of words at a level of semantic dependencies.

5. The method of claim 4, wherein the converting the plurality of phrasal edits into the plurality of disjunctive logical forms includes generating a bi-directional frequency distribution model for words in the first and second phrases, wherein the bi-directional frequency distribution model includes a probability that, given a particular first word of the words in the first and second phrases, a particular second word follows the particular first word and a particular third word precedes the particular first word.

6. A system, comprising:
   a question answering system executed by a computer;
   a processor; and
   a memory coupled to the processor, the memory encoded with instructions that when executed cause the processor to provide training for the question answering system at least in part by causing the processor to:
   receive a first phrase and a second phrase, the first and second phrases being paraphrases of each other;
   convert the first phrase into a first logical form and the second phrase into a second logical form;
   generate a phrasal edit that includes a difference between the first logical form and the second logical form;
   convert the phrasal edit into a disjunctive logical form in two directions;
   generate a first plurality of paraphrases of the first and second phrases based on the disjunctive logical form;
   determine a first score for a first paraphrase of the first plurality of paraphrases;
   determine a second score for a second paraphrase of the first plurality of paraphrases, wherein the first score is higher than the second score based in part on a first syntactic variation between the first paraphrase and the first phrase and the second phrase being greater than a second syntactic variation between the second paraphrase and the first phrase and the second phrase; and
   prune the first plurality of paraphrases to yield a second plurality of paraphrases including grammatical alternatives to the first and second phrases, wherein the first and second paraphrases are pruned based on the first score and the second score such that the first paraphrase is included in the second plurality of paraphrases and the second paraphrase is not included in the second plurality of paraphrases based on the first score being higher than the second score.

7. The system of claim 6, wherein the processor is further configured to provide the second plurality of paraphrases and intent of the first and second phrases to the question answering system as enriched ground truth.

8. The system of claim 6, wherein the disjunctive logical form includes a disjunction that represents an alternative word choice at a level of semantic dependencies.

9. The system of claim 8, wherein the processor is configured to convert the phrasal edit into the disjunctive logical form by generating a first trigram model.

10. The system of claim 9, wherein the first trigram model is a bi-directional frequency distribution model for words in the first and second phrases, and wherein the bi-directional frequency distribution model includes a probability that, given a particular first word of the words in the first and second phrases, a particular second word follows the particular first word and a particular third word precedes the particular first word.

11. The system of claim 6, wherein the processor is configured to:
   convert the first phrase into the first logical form by dependency parsing the first phrase to identify parts of speech of the first phrase thereby generating a first parsed representation of the first phrase; and
   convert the second phrase into the second logical form includes dependency parsing the second phrase to identify parts of speech of the second phrase thereby generating a second parsed representation of the second phrase.

12. A computer program product for generating paraphrases, the computer program product comprising a computer readable storage medium having program instructions embodied therewith, the program instructions executable by a computer to cause the computer to:
   receive a first phrase and a second phrase, the first and second phrases being paraphrases of each other;
   convert the first phrase into a first logical form and the second phrase into a second logical form;
   generate a plurality of phrasal edits that include differences between the first logical form and the second logical form;
   convert the plurality of phrasal edits into a plurality of disjunctive logical forms in two directions;
   generate a first plurality of paraphrases of the first and second phrases based on the plurality of disjunctive logical forms;
   determine a first score for a first paraphrase of the first plurality of paraphrases;
   determine a second score for a second paraphrase of the first plurality of paraphrases, wherein the first score is higher than the second score based in part on a first syntactic variation between the first paraphrase and the first phrase and the second phrase being greater than a second syntactic variation between the second paraphrase and the first phrase and the second phrase; and
   prune the first plurality of paraphrases to yield a second plurality of paraphrases containing grammatical alternatives to the first and second phrases, wherein the first and second paraphrases are pruned based on the first score and the second score such that the first paraphrase is included in the second plurality of paraphrases and the second paraphrase is not included in the second plurality of paraphrases based on the first score being higher than the second score.

13. The computer program product of claim 12, wherein the program instructions are further executable by the computer to cause the computer to convert the first phrase into the first logical form by dependency parsing the first phrase to identify parts of speech of the first phrase thereby generating a first parsed representation of the first phrase and the second phrase into the second logical form by dependency parsing the second phrase to identify parts of speech of the second phrase thereby generating a second parsed representation of the second phrase.

14. The computer program product of claim 13, wherein the program instructions are further executable by the computer to cause the computer to generate the plurality of phrasal edits by comparing the first parsed representation of the first phrase with the second parsed representation of the second phrase to determine a word from the first phrase that corresponds with a word from the second phrase.

15. The computer program product of claim 12, wherein the plurality of disjunctive logical forms includes a plurality of disjunctions that represent alternative choices of words at a level of semantic dependencies.

16. The computer program product of claim 15, wherein the program instructions are further executable by the computer to cause the computer to convert the plurality of phrasal edits into the plurality of disjunctive logical forms by generating a first trigram model.

17. The computer program product of claim 16, wherein the first trigram model is a bi-directional frequency distribution model for words in the first and second phrases and wherein the bi-directional frequency distribution model includes a probability that, given a particular first word of the words in the first and second phrases, a particular second word follows the particular first word and a particular third word precedes the particular first word.

* * * * *